United States Patent
Wakeman

[11] Patent Number: 6,024,476
[45] Date of Patent: Feb. 15, 2000

[54] OPTICAL FIBER LIGHTING OF CHANNEL LETTERS

[75] Inventor: Mark Lucas Wakeman, Rowayton, Conn.

[73] Assignee: US Sign and Fabrication Corporation, Wilton, Conn.

[21] Appl. No.: 09/063,533

[22] Filed: Apr. 21, 1998

[51] Int. Cl.$^7$ ........................................ F21V 8/00
[52] U.S. Cl. ................... 362/581; 362/559; 362/560; 362/812; 40/547
[58] Field of Search ................... 362/812, 554, 362/559, 560, 581; 40/547, 546

[56] References Cited

U.S. PATENT DOCUMENTS

| | | |
|---|---|---|
| 711,610 | 10/1902 | Wright . |
| 2,091,599 | 8/1937 | Larson et al. . |
| 4,141,058 | 2/1979 | Mizohata et al. ........................ 362/32 |
| 4,533,983 | 8/1985 | Hafstad ................................... 362/223 |
| 4,689,726 | 8/1987 | Kretzschmar ........................... 362/127 |
| 4,714,983 | 12/1987 | Lang ........................................ 362/27 |
| 4,745,525 | 5/1988 | Sheehy .................................... 362/559 |
| 4,747,025 | 5/1988 | Barton ..................................... 362/147 |
| 4,748,548 | 5/1988 | Barton ..................................... 362/249 |
| 4,837,667 | 6/1989 | Grau ........................................ 362/147 |
| 4,917,448 | 4/1990 | Oppenheimer ..................... 362/559 X |
| 4,994,943 | 2/1991 | Aspenwall .............................. 362/219 |
| 5,034,861 | 7/1991 | Sklenak et al. .......................... 362/92 |
| 5,040,320 | 8/1991 | Reidinger ........................... 362/559 X |
| 5,065,290 | 11/1991 | Makar et al. ........................... 362/132 |
| 5,072,343 | 12/1991 | Buers ..................................... 362/125 |
| 5,103,741 | 4/1992 | Grund et al. ............................. 108/50 |
| 5,151,679 | 9/1992 | Dimmick ................................ 340/326 |
| 5,160,565 | 11/1992 | Chazalon ........................... 362/559 X |
| 5,184,253 | 2/1993 | Hwang ............................... 362/554 X |
| 5,231,689 | 7/1993 | Reidinger ............................... 385/147 |
| 5,293,437 | 3/1994 | Nixon ................................ 362/554 X |
| 5,298,681 | 3/1994 | Swift et al. .............................. 174/48 |
| 5,461,548 | 10/1995 | Esslinger et al. ........................ 362/32 |
| 5,517,391 | 5/1996 | Grau ....................................... 362/147 |
| 5,572,818 | 11/1996 | Churchill ................................. 40/547 |
| 5,690,415 | 11/1997 | Krehl .................................... 362/125 |
| 5,695,261 | 12/1997 | Slesinger et al. .................... 312/223.6 |

*Primary Examiner*—Laura K. Tso
*Attorney, Agent, or Firm*—St. Onge Steward Johnston & Reens LLC

[57] ABSTRACT

A sign illuminator is described wherein a bundle of light conducting fibers are plied to a light diffusing plate having a plurality of recesses which receive the ends of the fibers in the bundle after the bundle is passed through an opening in the plate from an exterior side to an interior side. The plate is sized and shaped to conform to a channel in the sign so that when the light fibers are inserted into the light diffusing plate their light provides a back illumination for the sign. A light reflecting surface can be placed alongside the interior surface of the light diffusing plate to provide additional light use for the illumination of the sign. The sign can be letters or numbers or have such other shape as appears desirable.

6 Claims, 1 Drawing Sheet

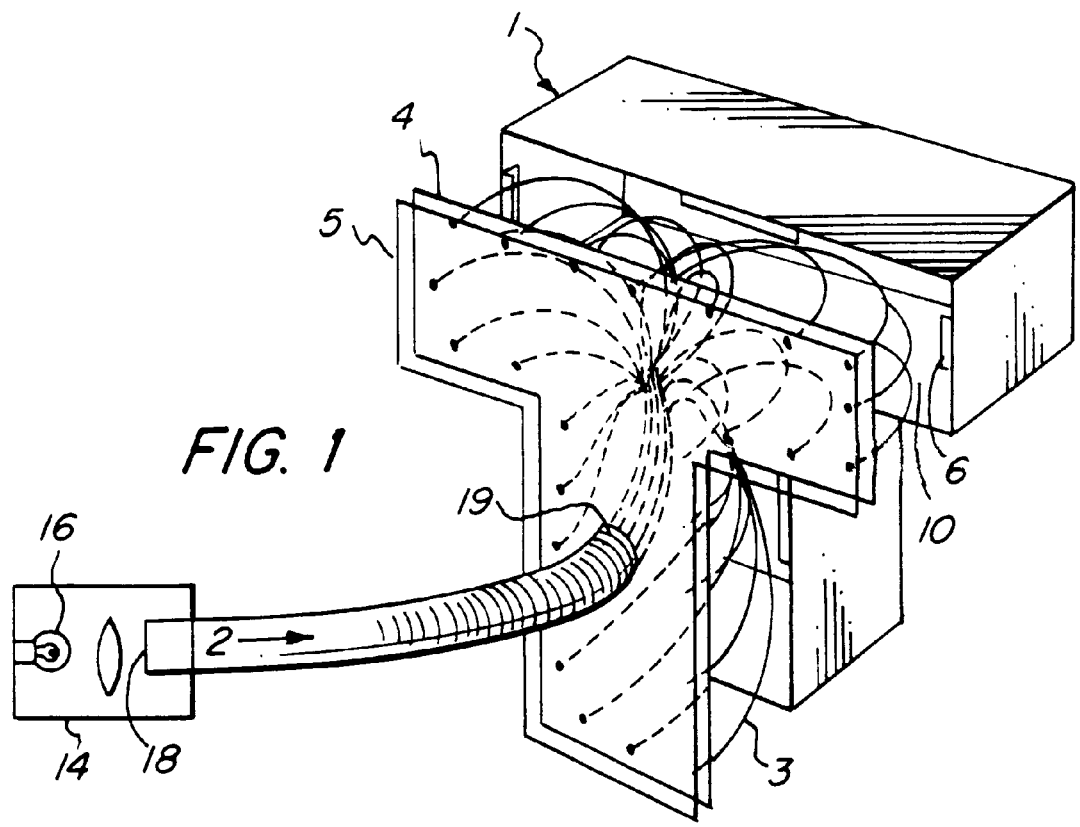
FIG. 1
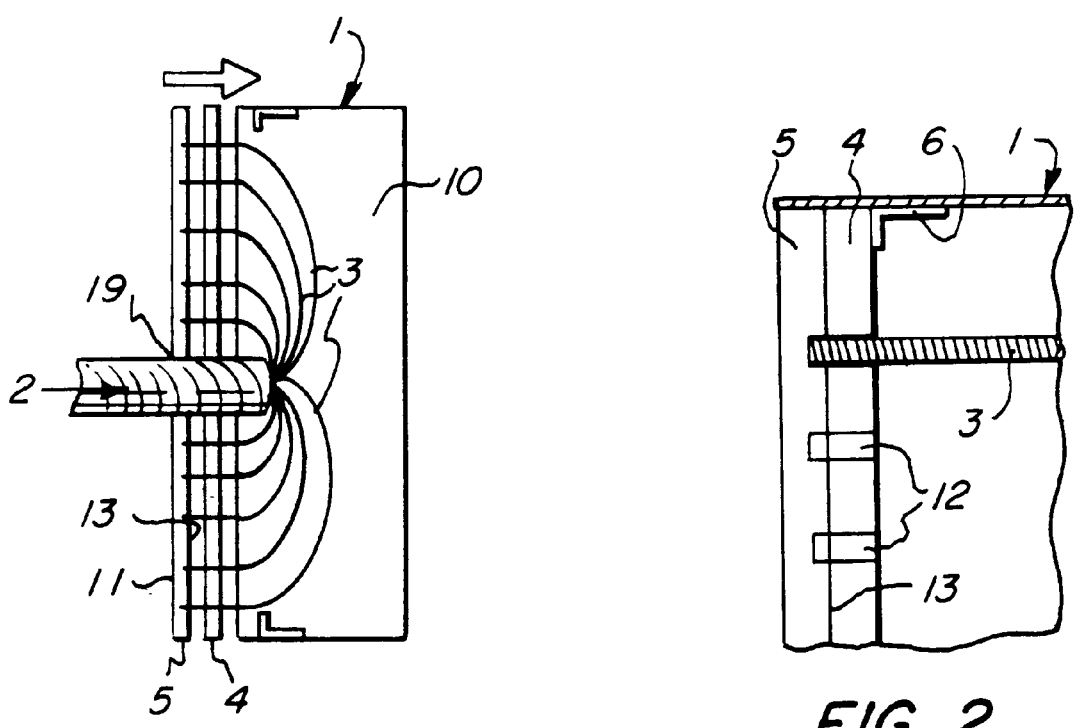
FIG. 3
FIG. 2

OPTICAL FIBER LIGHTING OF CHANNEL LETTERS

FIELD OF THE INVENTION

This invention relates generally to illuminated display signage and more particularly to a fiber optic illuminating device providing uniform reverse illumination of channel type letters and logos and other shaped displays.

BACKGROUND OF THE INVENTION

Traditionally in the sign industry, a frequently desired "halo" effect is achieved with the use of high voltage neon, incandescence or fluorescence type devices. These are located behind signs that are spaced from a wall so that the back illumination from these conventional light sources creates the so-called "halo" effect. These light sources require that the sign be at least sufficiently large in area so as to enable these light sources to hide behind the back of the sign. These traditional approaches in the sign industry are limited to letters large in size depth and stroke width. These constraints are both physical and building code imposed. As a result the back illumination of small signs or of signs whose cross-dimension is small cannot be accommodated with these conventional devices.

In a known technique using conventional fibers are provided to back illuminate signs. The light source and fibers are obtained from a well known supplier such as Supervision International of Orlando Fla. The light fibers are applied through holes in the wall to which the sign is to be attached and terminate in a cantilever fashion from the wall to illuminate the back of the sign. Light from these fibers is then reflected from the back of the sign towards the wall to provide the desired back illumination or halo effect. A problem with such back lighting is caused by the myriad holes that need to be made in the wall to accommodate the fibers as well as a reduced light intensity from the "halo".

In U.S. Pat. No. 5,231,689 light fibers are used to provide direct illumination of signs such as an EXIT sign. As illustrated in FIG. 5 of the '689 patent the fibers are recessed in a substrate material and then covered by a translucent layer containing glass beads. The translucent layer serves to disperse the light from the fibers. This approach does not lend itself to achieve back illumination with a halo effect for signs.

BRIEF SUMMARY OF THE INVENTION

This present invention provides a unique fiber optic approach to directly or indirectly illuminate reverse channel letters without heat or electricity inside the letters or inside the optical fiber bundle used to deliver light to the signs. This present invention is not limited to the same constraints in size, width and depth, whether they be physical or code restraints, that are usually associated with customary illuminating methods.

In accordance with one form of the present invention a fiber illuminating structure includes a light diffusing plate having a light reflecting surface adjacent an interior surface of the plate. The plate has an opening through which a bundle of light fibers is passed from an exterior surface and the fibers are then reversed by bending them back towards the interior surface of the plate and enter mounting recesses extending through the reflecting surface and into, but not through, the light diffusing plate. The light diffusing plate is shaped to correspond to the channels of a sign to be illuminated.

With this technique for making a optical fiber illuminated sign the installer does not have to make a large number of fiber receiving holes in a wall over which the sign is to be mounted and light from the ends of the fibers is used in a more efficient manner.

Accordingly, it is an object of this present invention to provide a distinct visual effect in signage utilizing a remote high intensity discharge (HID) type lamp in an enclosed light box as a light "server" to power the direct or indirect illumination of letters or signs.

It is a further object of this invention to provide a relatively simplistic task for those wishing to install letter and/or logos equipped with this "halo" light generating invention. Traditional installation techniques are a cumbersome task at best usually requiring the aid of licensed professionals. More specifically letters and logos equip with this invention will in most cases require only a single penetration in the applicable mounting medium.

Yet another objective of this invention is to expand the applicable size of letters capable of encompassing a design to achieve the desired illumination effect. This invention expands the applicable sizes of letter and logos. For example, the optical fibers (¾ mm or larger) in diameter) are capable of navigating narrow strokes in the signs. The absence of heat and electricity in the letters free this invention from being subjected to many local and state building codes.

These and other objects and advantages of the invention can be understood from the following detailed description of an illustrative embodiment as shown in the drawings.

BRIEF DESCRIPTION OF THE DRAWINGS

FIG. 1 is an exploded perspective view of a letter "T" equipped with the present invention.

FIG. 2 is a partial cross-sectional view of the present invention.

FIG. 3 is an enlarged partial cross-sectional view of a detailed assembly of the present invention.

DETAILED DESCRIPTION OF DRAWINGS

Referring now to the figures embodying the invention, and particularly FIG. 1, there is provided an illustrative letter "T" (shown generally as numeral 1) which includes in the components, a bundled fiber optic cluster 2 containing individual fiber optic strands 3, an interior plate or layer 4, an exterior light diffusing plate 5, and a support bracket 6.

The purpose of the letter "T" is to show an application of this invention to a sign. The sign 1 may be in the form of a corporate logo, a graphic, numeral, symbol or another letter or series of letters to spell out a word. The sign 1 preferably has a channel 10 for receiving light fibers 3 as these are distributed through the channel 10

The light diffusing plate 5 is provided with an interior light reflecting surface which can be obtained as shown generally at 4. The reflecting surface 4 can be in the form of a separate interior plate or a thin reflective layer formed of a reflective material such as mylar which is attached to light diffusing plate 5 with a suitable adhesive. The reflective layer 4 can be formed directly on the light diffusing plate 5.

Note that the light reflecting surface 4 could be dispensed with, though its use does improve the amount of back scattered light from light fibers 3.

The light diffusing plate is shaped with a likeness of the corresponding letter or logo in both size and shape so as to fit within the channel 10 of sign 1. The interior reflecting surface or plate 4 will fit securely along the inside perimeter of the housing of sign 1. Its primary purpose is: to act as a reflection of light towards the front surface 11 of the light diffusing plate 5 as seen in reference to FIG. 3 though it can also act to assist in housing or supporting the individual fiber optic stands 3.

The exterior light diffusing plate 5 fits securely along the inside perimeter of sign 1 with mechanical devices and methods such as suitable brackets or rod type fasteners anchored inside the channel 10. Alternatively the light diffusing plate is held within or onto the sign housing 1 with adhesive or tape or with friction.

The exterior light diffusing plate 5 is fastened to the reflector 4 with an adhesive to form a sandwiched structure as seen in FIG. 2. Alternatively mechanical devices and methods can be used to affix the reflector 4 to the light diffusing plate. Note that the light reflecting layer 4 can be quite thin, of the order of a mil or so and thus the thickness illustrated in FIG. 2 is not to scale.

The light diffusing plate or layer 5 is fabricated from a translucent material (for example, acrylic) with a thickness of approximately 1/8" or more. The plate can be plain white in translucency or such other color as is desirable. The light diffusing plate 5 is provided at its interior surface 13 with recesses 12 extending partially into the plate 5 and sized to receive ends of light fibers 3. As shown in FIG. 3 of the drawings, the purpose of partially extending the recesses 12 into the light diffusing plate 5 is to enable it to act as a diffuser of light. This is important in providing a uniform luminescence and eliminating "hot spots", or areas of higher illumination relative to other areas of illumination attributable to the high light intensity from the ends of the fibers 3.

The depth of recesses 12 can vary depending upon the effectiveness of the diffusion by the plate 5. Generally the depth is of the order of about 1/3 the thickness of the plate 5, leaving about 2/3 the thickness of the light diffusing plate 5 available for diffusing the pin points of lights generated by the ends of light fibers 3.

The fiber optic bundled cluster 2 may contain any number of light fibers, typically it contains several to some 500 light fibers 3. The bundle originates at the remote HID light source 14 that transmits light from a HID lamp 16 onto one proximal end 18 of the fiber optic cable 2 for transmission to the light diffusing plate 5. Light source 14 can include a color changing device in the form of a rotating color wheel.

The light diffusing plate 5 is provided with an opening 19 through which the fiber optic cable 2 is passed to enable the individual light fibers 3 to be reversed and inserted into recesses 12. After penetration of the exterior and interior plates 5, 4, the fibers 3 in the optic cluster 2 branch off and are reversed to be bent back as individual fiber optic strands or, in smaller clusters and strands 3, as indicated generally at 3. The fibers 3 have their distal ends polished and then inserted into individual recesses 12 with the spacing between adjacent fibers 3 typically between about 1/4" to 1".

The frequency or spacing between fibers 3 is determined by the size and shape of, and the desired intensity of light from, the signs or letters or logos 1 pertaining to a specific application. The fibers 3 penetrate through the reflective layer 4 to partially imbed in the light diffusing layer 5 where the luminous end of the fibers 3 will be facing out towards the outside or front surface 11 as seen in FIG. 3. The light fibers 3 can be held in place with an adhesive such as epoxy.

As shown in FIG. 1 and FIG. 3 support brackets 6 support the light diffusing plate 5 and its light reflector 4 so as to keep the outside or back surface of plate 5 flush with the back edge of sign 1.

With a back light illuminating structure in accordance with the invention now small signs can be provided with a "halo" effect. A uniform illumination, temperature and moisture tolerant sign illuminator is obtained which is easier to install by a user or installer.

Having thus described an illustrative embodiment of the invention its advantages can be appreciated. Variations from the embodiment can be made by one skilled in the art without varying from the scope of the invention as defined by the following claims. For example, the device described and shown can be used for direct illumination of a sign, which can be made sufficiently translucent to provide al illuminated sign.

What is claimed is:

1. An optical fiber sign illuminator using a bundle of light fibers carrying light from a light source from a proximal end to a distal end of the light fibers, comprising:

a light diffusing plate having an exterior and interior sides respectively having an exterior surface and an interior surface, with a plurality of distributed recesses partially penetrating the plate at its interior surface; the light diffusing plate further having an opening through which the bundle of fibers is passed from the exterior side to the interior side and with the distal ends of the light fibers being reversed so as to terminate inside the recesses to enable an illumination of the exterior surface of the light diffusing plate.

the distal ends of the light fibers being affixed into the recesses so as to illuminate the light diffusing plate to illuminate the sign.

2. The optical fiber sign illuminator as claimed in claim 1 and further including an interior light reflective layer, said interior light reflective layer being located adjacent the interior surface of the light diffusing plate.

3. The optical fiber sign illuminator as claimed in claim 1 wherein said sign has at its back a rearward facing channel and wherein said light diffusing plate is shaped correspondingly with the shape of the rearward facing channel in the back of the sign.

4. A back light sign illuminator for a sign having a rearward facing channel and using a bundle of light fibers carrying light from a light source from a proximal end to a distal end of the light fibers, comprising:

a light diffusing plate having an interior surface and an exterior surface and a light reflecting layer overlying the interior surface of the light diffusing plate; with a plurality of recesses penetrating the light reflecting layer and partially extending into the light diffusing plate; the light diffusing plate further having an opening through which the bundle is passed into the channel of the sign and with the distal ends of the light fibers being reversed so as terminate inside the recesses to enable an illumination of the exterior surface of the light diffusing plate;

the light diffusing plate overlying the channel in said sign and with fibers of the bundle extending through the opening being distributed throughout the channel;

the distal ends of the light fibers being affixed into the recesses so as to illuminate the light diffusing plate and direct light outwardly from the channel of the sign.

5. A back light sign illuminator for a sign having a rearward facing channel and using a bundle of light fibers carrying light from a light source from a proximal end to a distal end of the light fibers, comprising:

a light diffusing plate having an interior surface and an exterior surface; with a plurality of recesses partially extending into the light diffusing plate; the light diffusing plate further having an opening through which the bundle is passed into the channel of the sign and with the distal ends of the light fibers being reversed so as terminate inside the recesses to enable an illumination of the exterior surface of the light diffusing plate;

the light diffusing plate overlying the channel in said sign and with fibers of the bundle extending through the opening being distributed throughout the channel;

the distal ends of the light fibers being affixed into the recesses so as to illuminate the light diffusing plate and direct light outwardly from the channel of the sign.

6. The sign illuminator as claimed in claim 5 wherein said light diffusing plate is shaped to conform to an outer periphery of said channel.

* * * * *